US009253675B2

(12) United States Patent
Mach

(10) Patent No.: US 9,253,675 B2
(45) Date of Patent: Feb. 2, 2016

(54) APPARATUS AND METHOD TO CONTROL THE COLLECTION OF MEASUREMENT DATA IN A COMMUNICATION SYSTEM

(75) Inventor: Tomasz Mach, Fleet Hampshire (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 202 days.

(21) Appl. No.: 13/695,207

(22) PCT Filed: May 6, 2010

(86) PCT No.: PCT/FI2010/050365
§ 371 (c)(1),
(2), (4) Date: Dec. 18, 2012

(87) PCT Pub. No.: WO2011/138494
PCT Pub. Date: Nov. 10, 2011

(65) Prior Publication Data
US 2013/0208610 A1 Aug. 15, 2013

(51) Int. Cl.
H04W 24/10 (2009.01)

(52) U.S. Cl.
CPC .................. H04W 24/10 (2013.01)

(58) Field of Classification Search
None
See application file for complete search history.

(56) References Cited

U.S. PATENT DOCUMENTS

| 2005/0288024 | A1* | 12/2005 | Song ............................. 455/441 |
| 2007/0115796 | A1 | 5/2007 | Jeong et al. |
| 2007/0287476 | A1 | 12/2007 | Jeong et al. |
| 2009/0125220 | A1 | 5/2009 | Kim et al. |
| 2010/0041412 | A1* | 2/2010 | Yu ................................ 455/450 |
| 2010/0240356 | A1* | 9/2010 | Lee et al. ................... 455/422.1 |
| 2011/0183662 | A1* | 7/2011 | Lee et al. ................... 455/422.1 |
| 2011/0194441 | A1* | 8/2011 | Jung et al. ....................... 370/252 |
| 2011/0201279 | A1* | 8/2011 | Suzuki et al. .............. 455/67.11 |
| 2012/0108252 | A1* | 5/2012 | Dimou et al. ................. 455/450 |

FOREIGN PATENT DOCUMENTS

| CN | 1972515 A | 5/2007 |
| EP | 2 129 155 A1 | 12/2009 |
| EP | 2 242 301 A1 | 10/2010 |
| GB | 2 305 825 A | 4/1997 |
| KR | 2007-0027844 A | 3/2007 |
| KR | 2007-0105255 A | 10/2007 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.7.0, Dec. 2008, pp. 1-144.

(Continued)

Primary Examiner — Diane Lo
(74) Attorney, Agent, or Firm — Squire Patton Boggs (US) LLP

(57) ABSTRACT

An apparatus, method and system to control the collection and reporting of measurement data in a communication system. In one embodiment, an apparatus includes a processor (520) and memory (550) including computer program code. The memory (550) and the computer program code are configured to, with the processor (520), cause the apparatus to determine a mobility state of the apparatus, and collect and store measurement data in the memory (550) depending on the mobility state.

16 Claims, 8 Drawing Sheets

(56) References Cited

FOREIGN PATENT DOCUMENTS

| KR | 2009-0033146 | A | 4/2009 |
|---|---|---|---|
| WO | 97/21318 | A1 | 6/1997 |
| WO | 99/62285 | A1 | 12/1999 |
| WO | 2007/088381 | A1 | 8/2007 |
| WO | 2008/040962 | A1 | 4/2008 |
| WO | 2009/041791 | A2 | 4/2009 |
| WO | 20091087924 | A1 | 7/2009 |
| WO | 2009/099162 | A1 | 8/2009 |

OTHER PUBLICATIONS

"3rd Generation Partnership Project; Technical Specificatioon Group Radio Access Network; Radio Resource Control (RRC); Protocol Specification (Release 9)", 3GPP TS 25.331, V9.1.0, Dec. 2009, pp. 1-1759.

"3rd Generation Partnership Project; Technical Specification Group Radio Access Network; Evolved Universal Terrestrial Radio Access (E-UTRA) Radio Resource Control (RRC); Protocol Specification (Release 9)", 3GPP TS 36.331, V9.1.0, Dec. 2009, pp. 1-232.

"3rd Generation Partnership Project; Technical Specification Group Radio Access Network; Evolved Universal Terrestrial Radio Access Network (E-UTRAN); Self-Configuring and Self-Optimizing Network (SON) Use Cases and Solutions (Release 9)", 3GPP TR 36.902, V9.1.0, Mar. 2010, pp. 1-23.

"3rd Generation Partnership Project; Technical Specification Group Radio Access Network; Evolved Universal Terrestrial Radio Access (E-UTRA); User Equipment (UE) Procedures in Idle Mode (Release 9)", 3GPP TS 36.304, V9.2.0, Mar. 2010, pp. 1-32.

International Search Report and Written Opinion received for corresponding Patent Cooperation Treaty Application No. PCT/FI2010/050365, dated Feb. 4, 2011, 12 pages.

Office Action for corresponding Korean Patent Application No. 2013-0036095, dated Apr. 30, 2014, 4 pages.

Chinese Office Action dated Aug. 29, 2014, for corresponding Chinese Patent Application No. 201080066623.9.

Korean Office Action dated Oct. 30, 2014, for corresponding Korean Patent Application No. 10-2012-7031927.

Korean Office Action dated Apr. 27, 2015, for corresponding Korean Appln. No. 2012-7031927.

Chinese Office Action dated Apr. 14, 2015, for corresponding Chinese Patent Appln. No. 201080066623.9.

Nokia Corporation et al: "MDT architecture for idle mode reporting", 3GPP Draft; R2-100245, 3GPP, Mobile Competence Centre; 650, Route Des Lucioles; F-06921 Sophia-Antipolis Cedex; France, vol. Ran WG2, No. San Francisco, USA; Feb. 22, 2010, Feb. 16, 2010, XP050421727, pp. 1-5.

European Search Report dated May 27, 2015, for corresponding European Patent Appln. No. 10851031.4.

State Intellectual Property Office of China, Office Action for corresponding Chinese Patent Application No. 201080066623.9, dated Sep. 6, 2015.

* cited by examiner

APPARATUS AND METHOD TO CONTROL THE COLLECTION OF MEASUREMENT DATA IN A COMMUNICATION SYSTEM

RELATED APPLICATION

This application was originally filed as PCT Application No. PCT/FI2010/050365 filed May 6, 2010.

TECHNICAL FIELD

The present invention is directed, in general, to communication systems and, in particular, to an apparatus, method and system to control the collection and reporting of measurement data in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. The 3GPP LTE project produces new standards as well as standards recommendations for the UMTS.

The evolved universal terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3 GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate a large and variable number of communication devices transmitting a growing range of communication applications with fixed communication resources and limited portable battery energy storage capability. In current cellular communication systems, channel quality measurement data may be collected and reported on a continuing basis to a respective serving base station by the user equipment in connected (active) mode. In an idle mode (no dedicated radio connection with network established), the user equipment may collect and store quality measurement data internally in local memory and upload it later to the network (e.g., when a dedicated radio connection is established). One of the problems with user equipment collection and reporting of measurement data is the impact on user equipment processing and battery and memory consumption, as well as the impact on the network-signaling load. A parallel need is for the network to carefully select the user equipment for specific measurements for network management. Measurements in a user equipment connected mode are performed more often than measurements in an idle mode. Measurements from user equipment moving with high speed are less accurate than measurements made from user equipment at low speed. Currently, especially in an idle mode, the network has limited visibility of detailed user equipment mobility characteristics, so it is unable to precisely control the collection of measurements based on this information.

The current 3GPP specifications do not specify a process or method related to controlling or filtering the collection or reporting of measurements in relation to the current state of user equipment mobility. In terms of selecting user equipment for specific measurements, the 3GPP state of the art currently proposes static user equipment capability reporting, but does not dynamically identify a mobility aspect of the user equipment for controlling the acquisition, storage and reporting of measurement data.

In view of the growing deployment of communication systems such as cellular communication systems, it would be beneficial to control acquisition, storage and reporting of measurement data by user equipment to a base station to enable more efficient utilization of computing resources by the user equipment, and to enable more efficient utilization of communication resources by the communication system and network. Therefore, what is needed in the art is an apparatus, method and system that avoids the deficiencies of known communication systems for acquisition and reporting of measurement data by user equipment to the communication system and network to improve utilization of communication resources and improve the utilization of the user equipment such as reducing battery drain.

SUMMARY OF THE INVENTION

These and other problems are generally solved or circumvented, and technical advantages are generally achieved, by embodiments of the present invention, which include an apparatus, method and system to control the collection and reporting of measurement data in a communication system. In one embodiment, an apparatus includes a processor and memory including computer program code. The memory and the computer program code are configured to, with the processor, cause the apparatus to determine a mobility state of the apparatus, and collect and store measurement data in the memory depending on the mobility state.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

Figure 1:
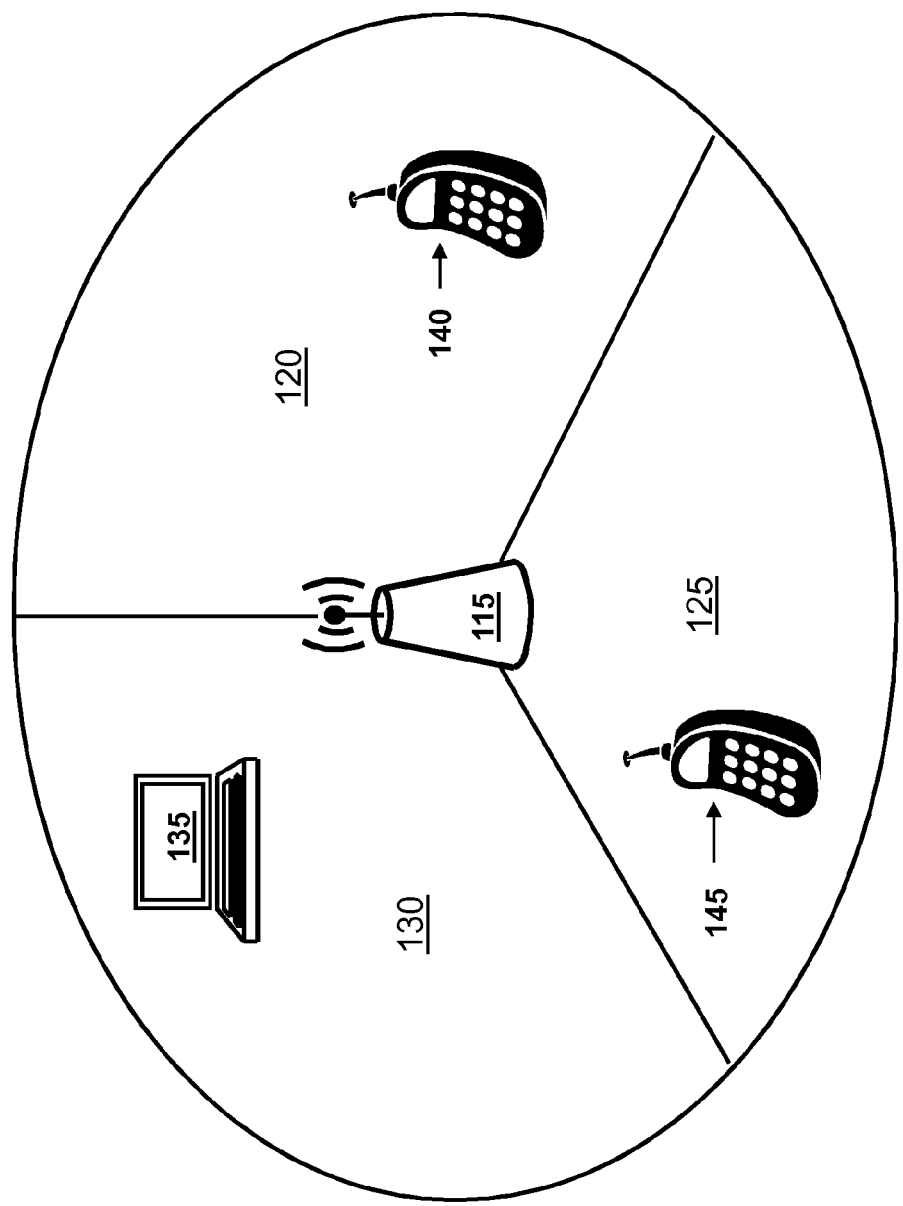
FIGS. 1 and 2 illustrate system level diagrams of embodiments of communication systems including a base station and wireless communication devices that provide an environment for application of the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for controlling acquisition, storage, and reporting of measurement data by a wireless communication device such as user equipment to a base station, thereby advantageously enabling more efficient utilization of computing resources by the user equipment, and advantageously enabling more efficient utilization of communication resources by the communication system and network. The process is applicable, without limitation, to any communication system including, without limitation, existing and future 3GPP technologies (i.e., UMTS, LTE) and is particularly suited for 3GPP Release-9 Work Item: Minimization of Drive Tests for E-UTRAN and UTRAN.

In U.S. Patent Application Publication No. 2009/0125220 entitled "Method and System for Measuring Traffic Information in CDMA Network," to Kim, et al. ("Kim"), a method is described for measuring traffic information by a traffic information analyzing device interworking with a user equipment connected to a base station subsystem ("BSS") of a synchronous code division multiple access ("CDMA") network or to a radio network controller ("RNC") of an asynchronous wideband code division multiple access ("WCDMA") network. The traffic information analyzing device acquires a location information message for the user equipment that is provided by the base station subsystem or radio network controller and stored in the user equipment. Location information of the user equipment is analyzed utilizing the location information message, and user equipment traffic information is calculated including a velocity of the user equipment in associated measurement regions by using the analyzed location information.

Kim is directed to a connected mode of operation for the user equipment with dedicated bidirectional communication with the radio network controller including measurement control and report signaling, active set update, handover, etc. However, the mobility estimation of the user equipment in an idle mode and counting a number of cell reselections in a period of time for its mobility estimation are not considered. Only location information analysis is provided to estimate the speed of the user equipment such as by employing an onboard global positioning system ("GPS"). Only connected mode handover in a connected mode mobility procedure is described. Kim specifies that the estimation of user equipment mobility is performed external to the user equipment. Kim further describes limiting a user equipment mobility data collection function to specific cell(s), but does not describe limiting collection of mobility data to the user equipment with specific speed or other mobility characteristics.

As introduced herein, the collection and utilization of mobility data for a user equipment is performed with internal user equipment functional capabilities. These actions may be performed by the user equipment in an idle mode when communication with the communication system or network is mainly unidirectional such as by utilizing a system information broadcast ("SIB") message transmitted by a base station to multiple user equipment. The mobility estimation is employed as an input to control the user equipment mobility data storing and reporting capabilities, and is not dependent on availability of its location information. The user equipment mobility estimation may be performed internally in the user equipment and is typically independent of external devices. In an idle mode, the network has limited visibility of user equipment inter cell mobility if there is no cell update/location update signaling procedure performed in the user equipment. The visibility is limited to its location area, which can include many cells.

The logging of the user equipment measurements is controlled and limited based on a current mobility state of the user equipment. The user equipment measurements are related to already available, but not limited to, idle or connected mode measurements in the user equipment (e.g., measurements of radio signal quality or power). These measurements may be immediately reported or stored in the user equipment (e.g., in an idle mode) and later transferred to the communication system or network for further processing and network optimization purposes (e.g., for a coverage optimization use case). The user equipment may transmit the measurement data to a serving base station in a connected mode. The user equipment may advantageously take mobility parameters and positioning accuracy into account to control the time to perform minimization of drive tests ("MDT") data collection and reporting.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multiple-input multiple-output ("C-MIMO") operation, etc. The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas.

Figure 2:
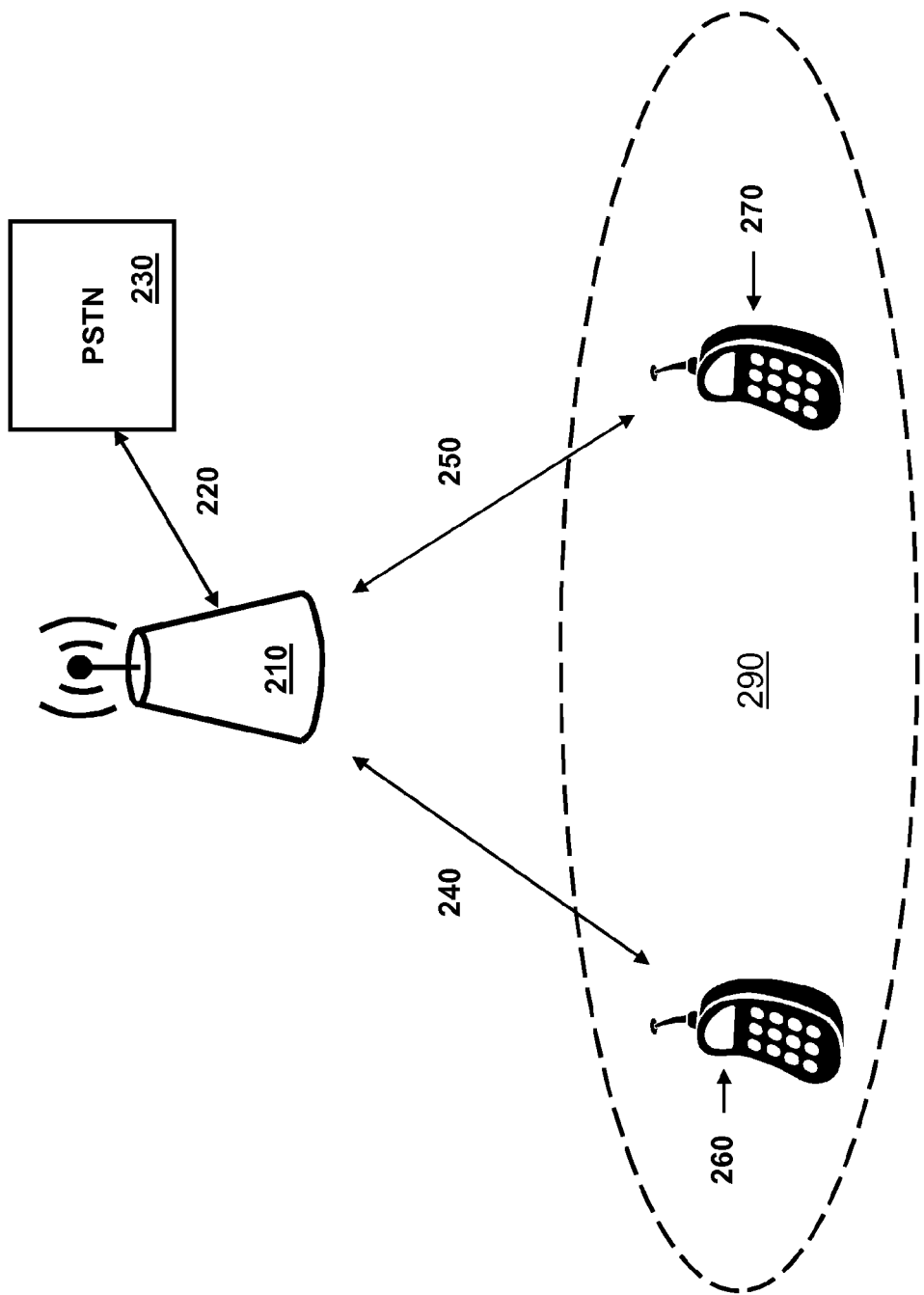

Turning now to FIG. 2, illustrated is a system level diagram of an embodiment of a communication system including wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes.

Figure 3:
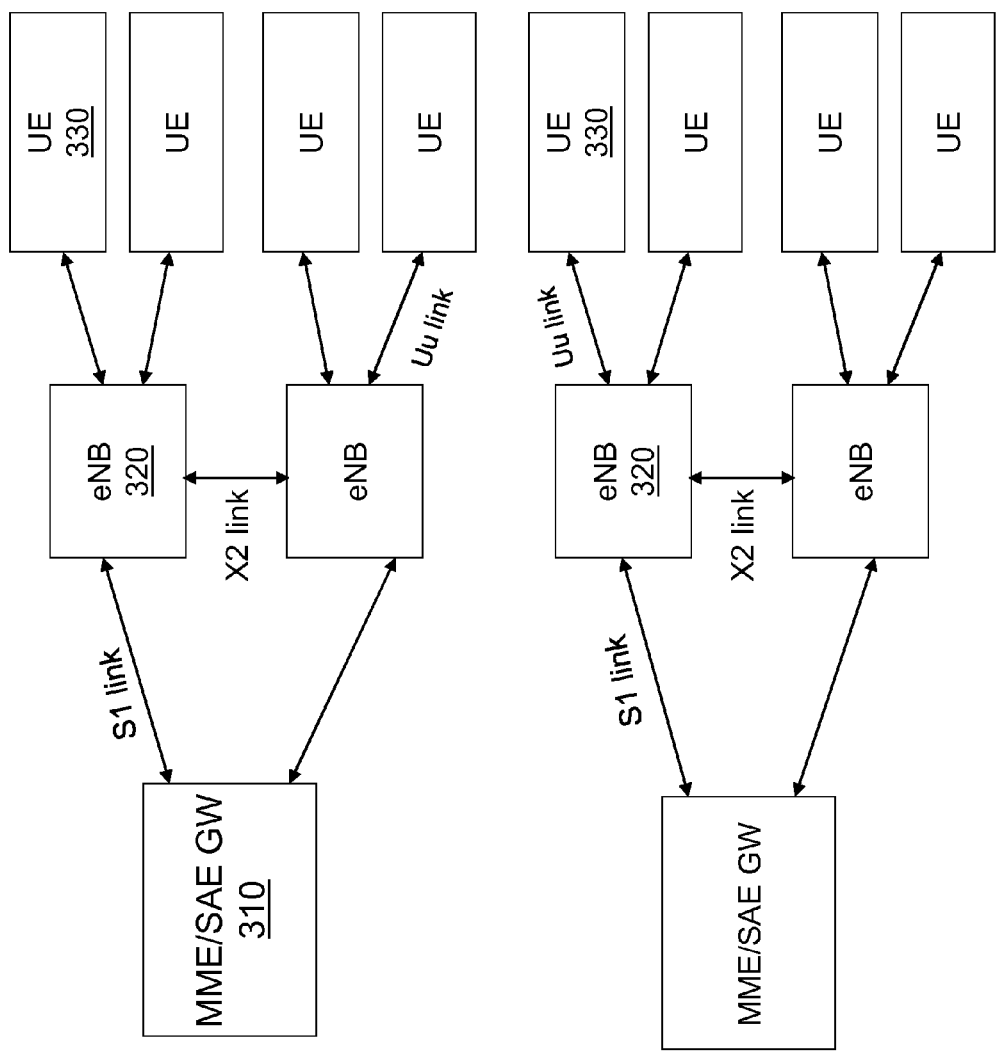
FIGS. 3 and 4 illustrate system level diagrams of embodiments of communication systems including a wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link") The base stations 320 communicate via X2 communication links (ones of which are designated "X2 link"). The various communication links are typically fiber, microwave, or other high-frequency metallic communication paths such as coaxial links, or combinations thereof.

The base stations 320 communicate with user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal.

Figure 4:
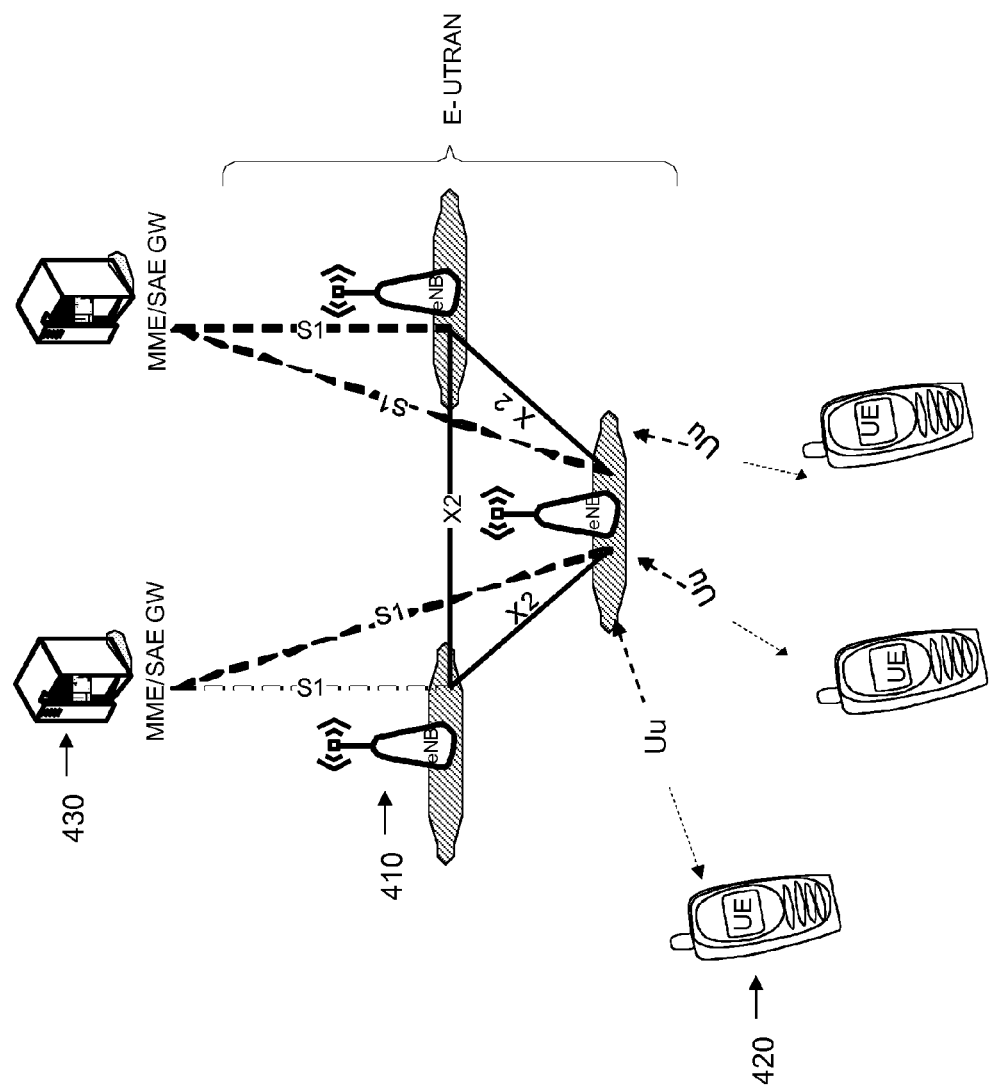

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards user equipment (one of which is designated 420). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of U-plane packets for paging reasons, switching of U-plane for support of the user equipment mobility, idle mode mobility control, and system architecture evolution bearer control. The user equipment 420 receives an allocation of a group of information blocks from the base stations 410.

Figure 5:
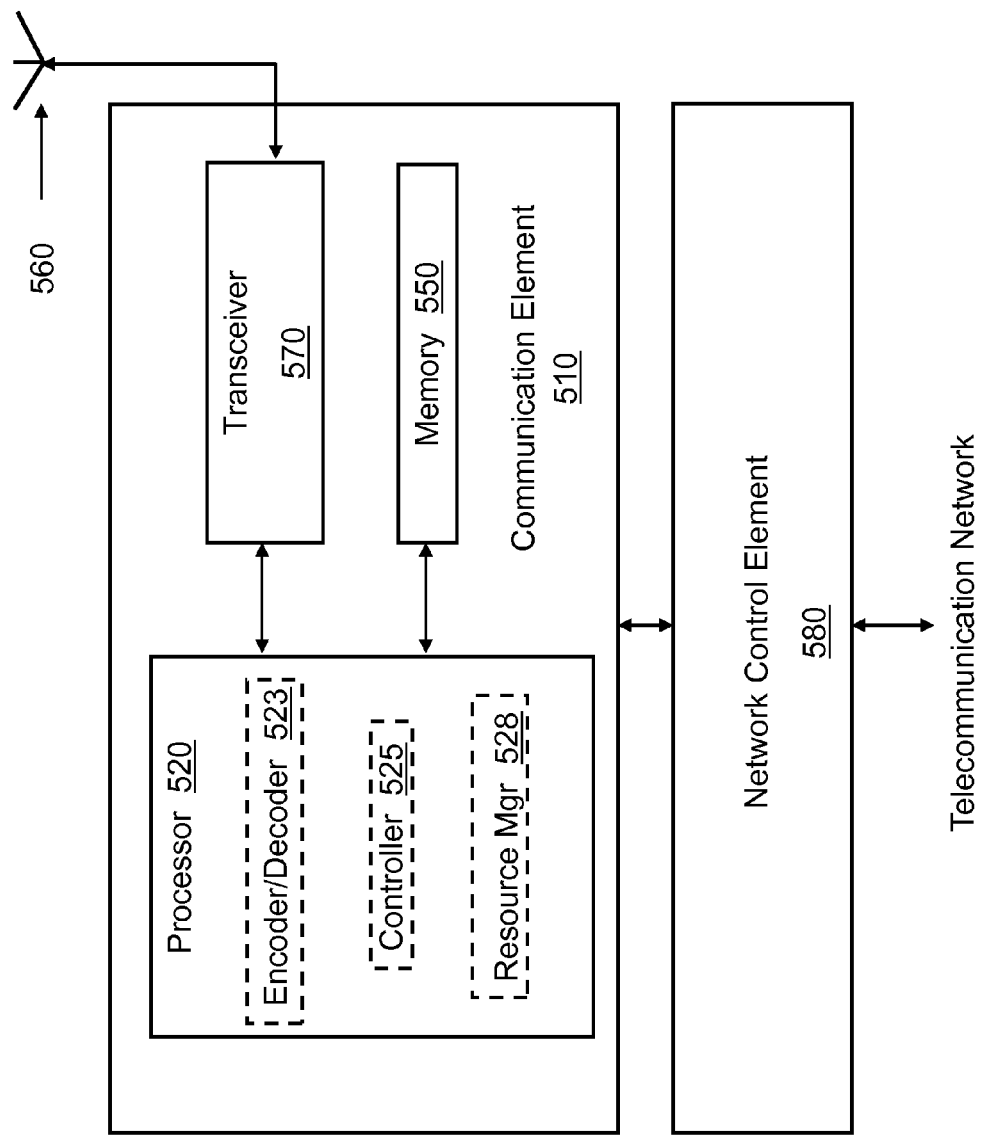
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment), a network control element, a communication node, or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 may provide point-to-point and/or point-to-multipoint communication services.

The communication element 510, such as a base station in a cellular network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communication, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 550, the resource manager 528 is configured to allocate time and frequency communication resources for transmission of data to/from the communication element 510 and format messages including the communication resources therefor. Additionally, the resource manager 528 is configured to determine a mobility state of a wireless communication device, and collect and store measurement data in the memory 550 depending on the mobility state.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna 560 to another communication element. The transceiver 570 demodulates information received via the antenna 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

The apparatus, method and system as introduced herein controls the collection and reporting of measurement data based on dynamic user equipment mobility information. This functionality is particularly related to the user equipment measurement accuracy (e.g., for coverage optimization purpose) being variable, particularly as the mobility state of the user equipment varies and as the communication mode of the user equipment changes.

The mobility state determination of user equipment in an LTE communication system is typically based on three different mobility states, namely, low mobility, medium mobility and high mobility. Based on these mobility states, which may be evaluated in user equipment both in an idle and connected mode, the user equipment is able to control the scope of measurements performed, stored and reported. A detailed control strategy may be provided by a base station using available communications methods (e.g., dedicated radio resource control signaling in a connected mode or system information broadcast messages in an idle mode). The apparatus and method as described herein performs measurements and collects, stores and reports measurement data based on a user equipment mobility.

The internal user equipment measurement collection or reporting capability is adapted based on a control criterion such as a user equipment mobility state. As a control criterion, the following non-limiting factors may be employed. A first factor employable as a mobility characteristic of a user equipment is the number of cell reselection or changes in a period of time observed in a cellular communication system or network. The user equipment mobility state may be described as low, medium or high. For example, a user equipment that reselects or changes cells more frequently than five times per minute could be described as being in a high mobility state. A user equipment that changes cells less frequently than one time per minute could be described as being in a low mobility state. Otherwise the user equipment could be described as being in a medium mobility state.

Another factor employable as a mobility characteristic of a user equipment is the speed or velocity (e.g., meters/second ("m/s")) thereof. For example, the speed or velocity of the user equipment may be determined by an onboard global positioning system, and thresholds (e.g., one or five m/s) may be established to describe the user equipment mobility state as being low, medium or high. In an alternative embodiment, radial speed of the user equipment may be measured employing a transit delay of a signal transmitted from a base station to the user equipment, or from the user equipment to a base station. Yet another factor employable as a mobility characteristic of a user equipment is an accuracy of geographical measurements (e.g., in meters). For example, a standard deviation less than a threshold level of a geographical measurement of a location of the user equipment may be employed to determine its mobility characteristic.

Figure 6A:
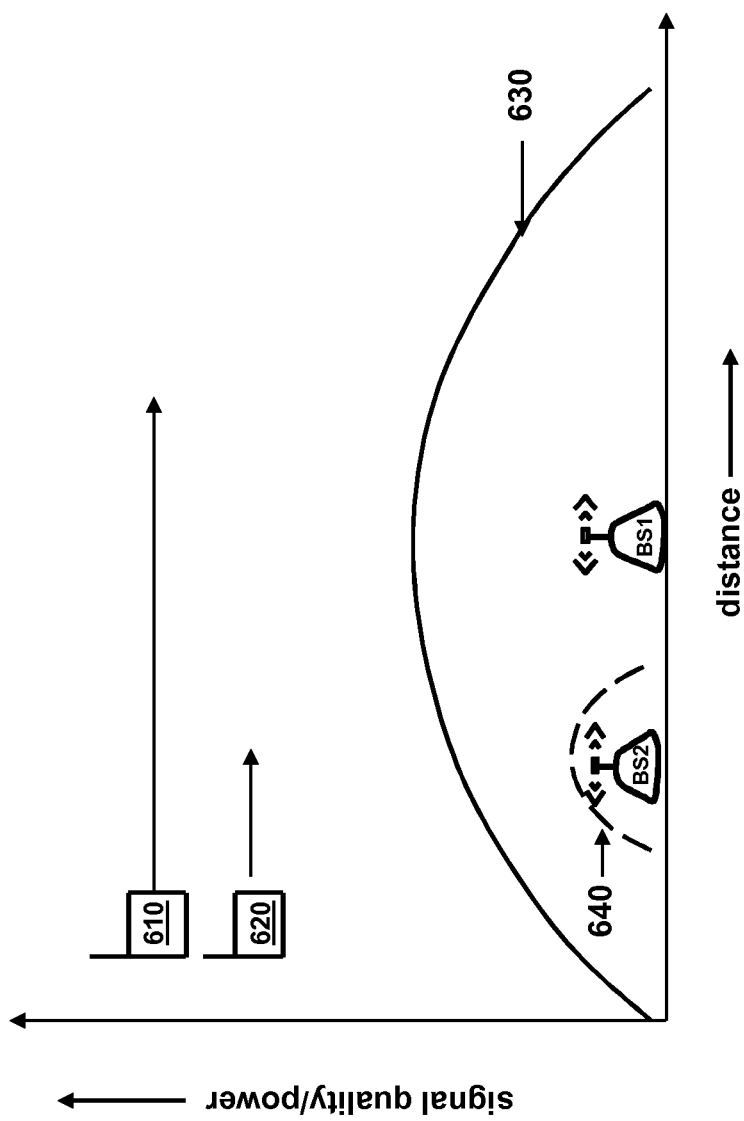
FIGS. 6A and 6B illustrate graphical representations of an exemplary difference in measurement accuracy between user equipment with high mobility and low mobility in accordance with the principles of the present invention.
Figure 6B:
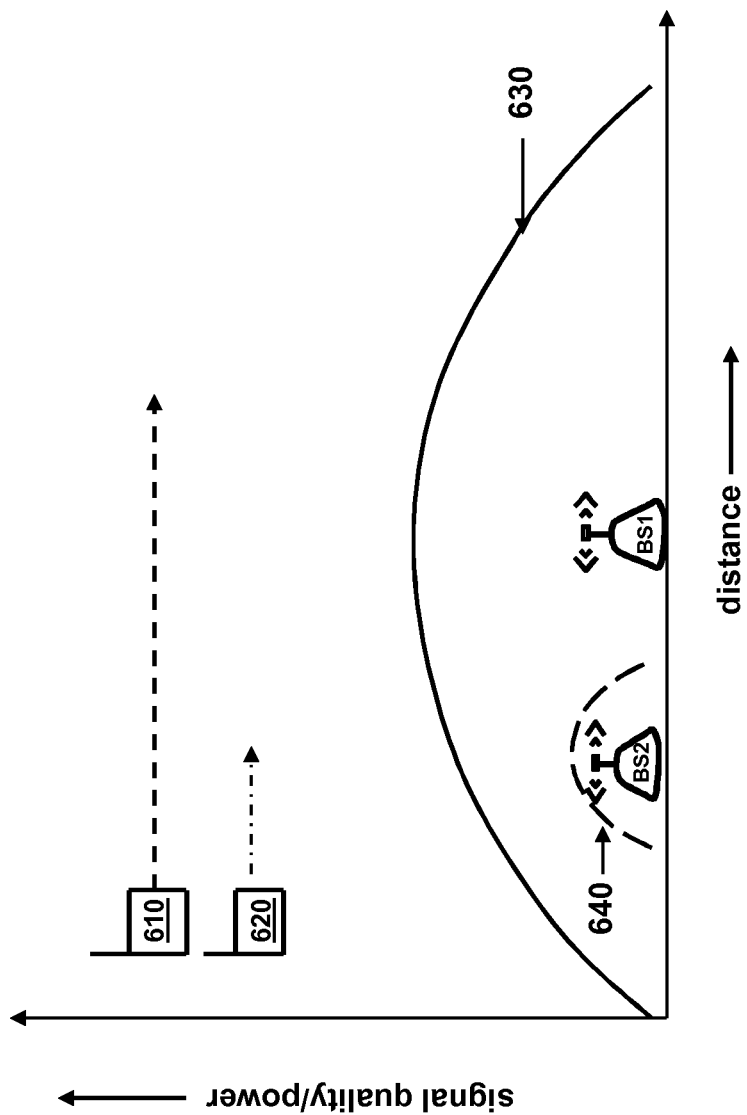

Turning now to FIGS. 6A and 6B, illustrated are graphical representations of an exemplary difference in measurement accuracy between user equipment with high mobility and low mobility in accordance with the principles of the present invention. A high mobility user equipment is designated 610 and a low mobility user equipment is designated 620. The horizontal axis represents distance between the user equipment and a base station. The vertical axis represents communication signal quality or signal power at the user equipment. A rapidly moving or high mobility user equipment 610 has lower detection probability of a femtocell (that is available on frequency two) than a slowly moving or low mobility user equipment 620, assuming the same interfrequency measurement rate in both user equipment. This difference reduces the suitability and reliability of measurement data for high mobility user equipment 610 collected for radio communication system or network coverage optimization purposes.

As illustrated in FIG. 6A, the curve 630 shows a signal quality as a function of distance between a base station BS1 (e.g., located in the center of a macro cell) and the user equipment 610, 620. As the user equipment 610, 620 moves farther away from the base station BS1, the signal quality decreases in both directions. The same principle applies to curve 640 for a base station BS2 in a micro cell (femtocell). In addition to the principles discussed above with respect to FIG. 6A, the graphical representation of FIG. 6B demonstrates that although idle mode periodic measurements are performed in both high and low mobility user equipment 610, 620 with the same frequency (e.g. every discontinuous reception), they provide different geographical/coverage information accuracy due to mobility/speed difference. This concept is illustrated by the different line structures of the high and low mobility user equipment 610, 620.

Figure 7:
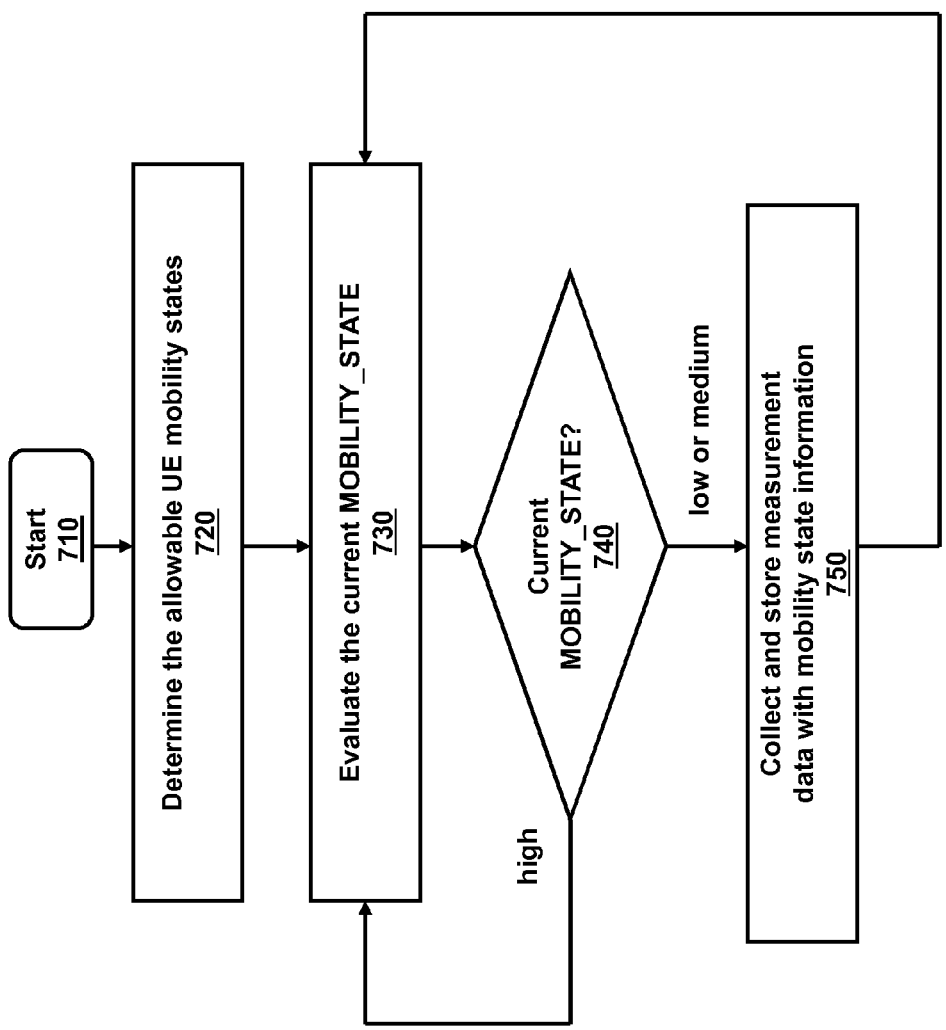
FIG. 7 illustrates a flowchart of an embodiment of a method for implementing control of measurements performed in a wireless communication device in an idle mode for minimization of drive tests ("MDT") in accordance with the principles of the present invention.

Turning now to FIG. 7, illustrated is a flowchart of an embodiment of a method for implementing control of measurements performed in a wireless communication device in an idle mode for minimization of drive tests ("MDT") in accordance with the principles of the present invention. The method for implementing control of measurements performed in a wireless communication device in an idle mode could also be extended to support radio network self optimization. The method begins in a step or module 710. In a step or module 720, the allowable user equipment mobility states ("MOBILITY_STATE," e.g., a low, medium or high mobility state) are read or otherwise determined (e.g., from the communication system or network, or from a subscriber identity module ("SIM") card). In a step or module block 730, the current MOBILITY_STATE is evaluated. In a step or module 740, if the current MOBILITY_STATE is low or medium (e.g., a predefined mobility state), the method transitions to step or module 750, wherein measurement data are collected and stored with the mobility state information. At the next measurement opportunity, the method returns to step or module 730, wherein the current MOBILITY_STATE is evaluated, and the method is repeated. If the current MOBILITY_STATE is high, measurement data is not collected and the method returns to step of module 730. The mobility state may be stored with the measurement data in case a communication system operator wants to get the data from high-speed areas such as a high-speed train or a fast highway, and is not willing to set up a hard threshold level limiting logging of the measurement data based only on the mobility state.

By introducing a new mobility-related process to manage collecting, storing and reporting of measurement data in a user equipment, the negative impact of such processes on memory and battery consumption can be substantially reduced, which affects a user experience in a positive manner. In user equipment, the data signaling load in the communication system or network is also reduced. When such control is implemented, support of minimization of drive tests use cases can be improved (e.g., coverage optimization) as defined in 3GPP TR 36.902 v9.1.0 (2010-03) in 3GPP specifications, which is incorporate herein by reference. Additionally, the solution may be implemented principally via software additions within processes of the user equipment and base station. The solution can be easily implemented in LTE user equipment, because an existing mobility detection mechanism defined in 3GPP specifications 3GPP TS 36.304 v9.2.0 (2010-03), which is incorporated herein by reference, may be employed. The solution could increase the quality and accuracy of the user equipment minimization of drive tests related measurements data for radio network optimization purposes.

Thus, an apparatus, method and system are introduced herein to control the collection and reporting of measurement data in a communication system. In one embodiment, an apparatus (e.g., user equipment) includes memory and computer program code configured to, with a processor, cause the apparatus to determine a mobility state of the apparatus, and collect and store measurement data (e.g., signal quality or power) in the memory depending on the mobility state. For instance, the apparatus may collect and store the measurement data in the memory when the apparatus is in a predefined mobility state (e.g., a low or medium mobility state). When the apparatus is in a connected mode, the memory and computer program code is configured to, with the processor, cause the apparatus to transmit the measurement data to a base station (e.g., a serving base station). The mobility state of the apparatus may be determined by a velocity thereof in accordance with a global positioning system or a number of cell reselections/cell handovers thereof in a period of time. The apparatus may determine the mobility state thereof, and collect and store the measurement data in the memory in accordance with a control strategy from a base station. The apparatus may receive the control strategy from the base station through radio resource control signaling when the apparatus is in a connected mode or a system information broadcast message when the apparatus is in an idle mode. The apparatus is employable in a communication system operable according to 3GPP LTE standards.

In another embodiment, an apparatus (e.g., base station) includes memory and computer program code configured to, with a processor, cause the apparatus determine a mobility state of a user equipment, and direct the user equipment to collect and store measurement data (e.g., signal quality or power) in memory depending on the mobility state. For instance, the apparatus may direct the user equipment to collect and store the measurement data in a memory thereof when the user equipment is in a predefined mobility state (e.g., a low or medium mobility state). When the user equipment is in a connected mode, the memory and computer program code is configured to, with the processor, cause the apparatus to receive the measurement data. The mobility state of the user equipment may be determined by a velocity thereof in accordance with a global positioning system or a number of cell reselections/cell handovers thereof in a period of time. The apparatus may direct the user equipment to collect and store the measurement data in accordance with a control strategy. The apparatus may transmit the control strategy to the user equipment through radio resource control signaling when the user equipment is in a connected mode or a system information broadcast message when the user equipment is in an idle mode. The apparatus is employable in a communication system operable according to 3GPP LTE standards.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
    a processor; and
    memory including computer program code
    said memory and said computer program code configured to, with said processor, cause said apparatus to perform at least the following:
    determine a current mobility state from a plurality of mobility states of said apparatus in an idle mode or a connected mode;
    determine whether or not to collect, store, and report measurement data in said memory depending on said current mobility state;
    at least one of collect, store, or report based on said current mobility state; and
    determining the mobility state by determining at least one of a velocity in accordance with a global positioning system or a number of cell reselections/cell handovers in a period of time.

2. The apparatus as recited in claim 1 wherein said memory and said computer program code is configured to, with said processor, cause said apparatus to collect and store said measurement data in said memory when said apparatus is in a predefined mobility state.

3. The apparatus as recited in claim 1 wherein said memory and said computer program code is configured to, with said processor, cause said apparatus to transmit said measurement data to a base station in a connected mode.

4. The apparatus as recited in claim 1 wherein said measurement data comprises signal quality or power received at said apparatus.

5. The apparatus as recited in claim 1 wherein said memory and said computer program code is configured to, with said processor, cause said apparatus to determine said mobility state of said apparatus, and collect and store said measurement data in said memory in accordance with a control strategy from a base station.

6. The apparatus as recited in claim 5 wherein said memory and said computer program code is configured to, with said processor, cause said apparatus to receive said control strategy from said base station through radio resource control signaling when said apparatus is in a connected mode or a system information broadcast message when said apparatus is in an idle mode.

7. A method, comprising:
    determining a current mobility state from a plurality of mobility states of a user equipment in an idle mode or a connected mode;
    determining whether or not to undergo collecting, storing, and reporting measurement data in memory depending on said current mobility state;
    at least one of collecting, storing, reporting based on said current mobility state; and
    determining the mobility state by determining at least one of a velocity in accordance with a global positioning system or a number of cell reselections/cell handovers in a period of time.

8. The method as recited in claim 7 wherein said collecting and storing said measurement data is performed when said user equipment is in a predefined mobility state.

9. An apparatus, comprising:
    a processor; and
    memory including computer program code
    said memory and said computer program code configured to, with said processor, cause said apparatus to perform at least the following:
    determine a current mobility state from a plurality of mobility states of a user equipment in an idle mode or a connected mode, wherein the mobility state is determined by at least one of a velocity in accordance with a global positioning system or a number of cell reselections/cell handovers in a period of time;
    direct said user equipment to determine whether or not to collect, store, and report measurement data depending on said current mobility state; and
    at least one of collect, store, and report based on said current mobility state.

10. The apparatus as recited in claim 9 wherein said memory and said computer program code is configured to, with said processor, cause said apparatus to direct said user equipment to collect and store said measurement data when said user equipment is in a predefined mobility state.

11. The apparatus as recited in claim 9 wherein said memory and said computer program code is configured to, with said processor, cause said apparatus to receive said measurement data when said user equipment is in a connected mode.

12. The apparatus as recited in claim 9 wherein said measurement data comprises signal quality or power received at said user equipment.

13. The apparatus as recited in claim 9 wherein said memory and said computer program code is configured to, with said processor, cause said apparatus to direct said user equipment to collect and store said measurement data in accordance with a control strategy.

14. The apparatus as recited in claim 13 wherein said memory and said computer program code is configured to, with said processor, cause said apparatus to transmit said control strategy to said user equipment through radio resource control signaling when said user equipment is in a connected mode or a system information broadcast message when said user equipment is in an idle mode.

15. A method, comprising:
- determining a current mobility state from a plurality of mobility states of a user equipment in an idle mode or a connected mode, wherein the mobility state is determined by at least one of a velocity in accordance with a global positioning system or a number of cell reselections/cell handovers in a period of time;
- directing said user equipment to determine whether or not to collect, store, and report measurement data depending on said current mobility state; and
- at least one of collect, store, or report based on current mobility state.

16. The method as recited in claim 15 wherein said directing said user equipment to collect and store said measurement data occurs when said user equipment is in a predefined mobility state.

\* \* \* \* \*